United States Patent [19]

Staley

[11] 4,273,569

[45] Jun. 16, 1981

[54] NECK RING MECHANISM

[75] Inventor: Warren D. Staley, Painted Post, N.Y.

[73] Assignee: Corning Glass Works, Corning, N.Y.

[21] Appl. No.: 120,330

[22] Filed: Feb. 11, 1980

[51] Int. Cl.$^3$ .................... C03B 9/325; C03B 9/40
[52] U.S. Cl. ...................................................... 65/360
[58] Field of Search ................................. 65/360, 266

[56] References Cited
U.S. PATENT DOCUMENTS

| 2,263,126 | 11/1941 | Gray et al. | 65/266 X |
| 2,466,669 | 4/1949 | Winder | 65/360 X |
| 3,622,305 | 11/1971 | Becker | 65/229 |

*Primary Examiner*—Richard V. Fisher
*Attorney, Agent, or Firm*—Burton R. Turner

[57] ABSTRACT

Neck ring apparatus is disclosed for retaining and conveying glass along a predetermined path as the glass is transformed from an initially formed parison to a final blown glass article having a desired finish. A pair of sprockets, forming a part of the neck ring mechanism, selectively engage roller tracks as the mechanism proceeds along its predetermined path to (1) open segments of the neck ring so as to permit the delivery of a charge of molten glass to a mold position therebelow, (2) to close the neck ring segments so as to form a finish on an initially formed parison and retain such parison by said finish, (3) rotate the neck ring and accordingly said parison for uniformly cooling the parison and for removing blow mold seams during the blowing of the final article, and (4) to open the neck ring segments to remove the finished article therefrom.

18 Claims, 9 Drawing Figures

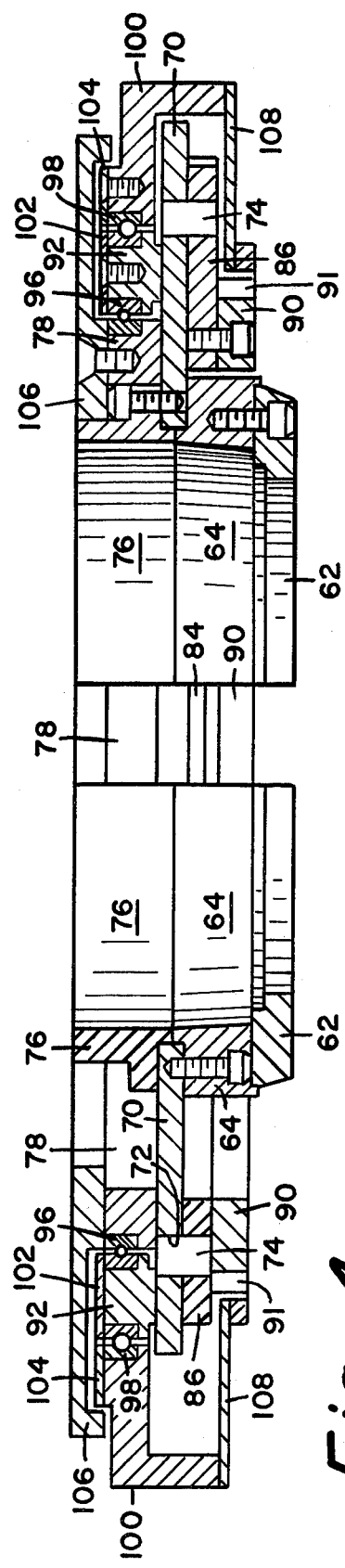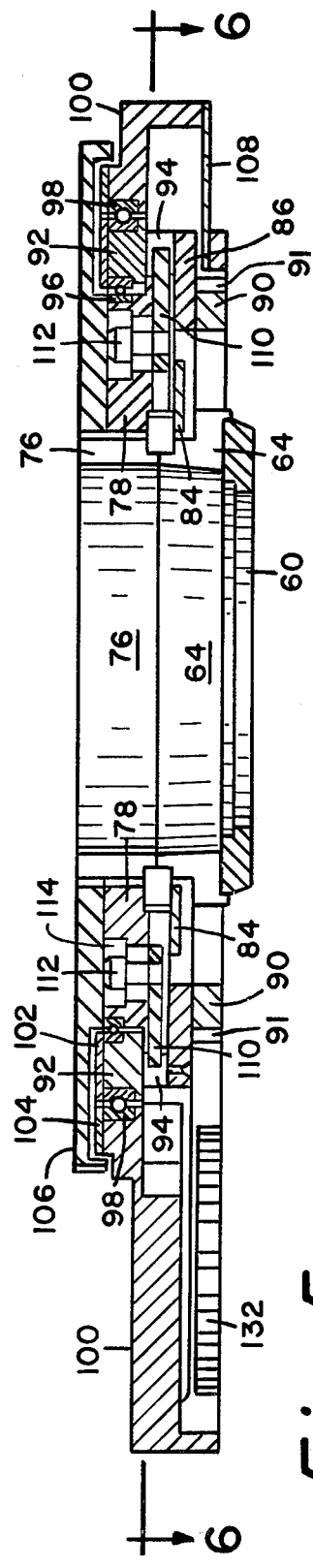

NECK RING MECHANISM

BACKGROUND OF THE INVENTION

This invention relates to the art of conveying articles along a predetermined path, and more particularly to neck ring apparatus for conveying and manipulating an initially formed glass parison along a predetermined path as the parison is transformed into a final blown article having a desired finish formed by the neck ring, and for releasing the finished article at a desired location.

In the formation of hollow glassware, a charge of molten glass is usually initially formed into a parison, such as by pressing or blowing such charge within a parison mold, and the thus formed parison is then conveyed or transported along a predetermined path to a blow mold for blowing the same into a finished article. During its travel along such predetermined path toward the blow mold, the parison may be subjected to thermal conditioning such as heating or cooling, and the parison may be provided with initial puffs of forming air.

The use of conveyors such as orifice plates or neck rings for transporting parisons along predetermined paths has been known in the art as shown by U.S. Pat. Nos. 2,263,126 and 3,622,305. U.S. Pat. No. 2,263,126 discloses the use of an orifice plate which receives a preformed patty or parison which is conveyed along a predetermined path to a blow mold and a final crack-off operation for removing the finished article. As the orifice plate moves along the predetermined path, a blow head initially pressably engages the patty about the orifice of the plate upon which it is positioned and provides initial forming puffs of air as the parison elongates through the orifice. The orifice plate is rotated during the initial forming and during the blowing of the article into its finished shape within the blow mold, whereupon the orifice plate retaining the finished article is moved onwardly to a crack-off station wherein the neck of the ware is cracked off from the moil or cullet retained on the orifice plate, thus producing a blown article with an unfinished neck portion. The neck ring of U.S. Pat. No. 3,622,305 is moved along an endless flexible conveyor such that the neck ring transports parisons from an initial parison forming station, past a preliminary treating unit, onto blow molds for blowing finished containers, and then away from the blow molds to a removal conveyor. Although the neck rings of such patent are openable to release the finished article, they are not rotatable and do not open to accommodate the charging of a parison mold.

The present invention overcomes the problems of unfinished finish and neck areas occasioned by crack-off operations by providing a neck ring mechanism having an openable split neck ring facilitating the manufacture of articles having finished neck and finish areas, and further overcomes the problems of forming ware with mold seams by selectively rotating the neck ring segments during the blowing operation.

SUMMARY OF THE INVENTION

In its simplest form, the present invention sets forth a neck ring mechanism having neck ring segments which are programmed to open to receive a charge of molten glass therethrough, to close to form a desired finish during the press forming of a parison, to rotate during the thermal conditioning and blowing of the parison into a final article, and to open for releasing the finished article, all at programmed times and positions along the path of travel of the neck ring mechanism. The neck ring mechanism includes a metal neck ring having an internal diameter shaped to conform to the desired contour of the outside diameter of the top or finish area of the glass article to be formed. The neck ring is split into two or more segments which are separable to allow the finished glass article to be removed from the ring. In addition, the neck ring segments are separated or moved to an open position to permit a charge of molten glass to drop therethrough and into a parison mold positioned therebelow. The neck ring segments are then moved to a closed position to form a complete neck ring and the neck ring, the charged parison mold and a plunger are brought into operable engagement so as to initially press form the gob into a parison having an outside surface shaped by the neck ring and parison mold and an inside surface formed by the plunger.

The neck ring mechanism is conveyed along a predetermined path with the parison retained by the neck ring. Puffs of air may be introduced into the parison to preform the same as it moves along such path and cooling air or other thermal conditioning may be applied thereto. The neck ring carrying the parison is rotated during such movement so that the thermal conditioning will be equal circumferentially about the article. The suspended parison carried by the neck ring then enters a blow mold which is closed thereabout and the parison is blown into a final article conforming to the inner contour of the blow mold while the neck ring and suspended article are rotated so that the seams from the split blow mold are wiped smooth. The finished article is removed from the blow mold after solidifying sufficiently to maintain its structural integrity and the rotation of the neck ring is stopped, preferably with a slow down stage so that a deceleration shock will not crack the glass from the neck ring. After further cooling, the neck ring segments are opened to release the glass upon a suitable conveyor for removal from the predetermined path of the neck ring mechanism, and the cycle is repeated.

It thus has been an object of the present invention to provide an improved neck ring mechanism for continuously conveying an initially formed parison along a predetermined path wherein it is formed into a final blown article, for permitting the formation of a finished neck or finish area on such article by being operable, and for rotating the article to remove mold seams from its surface.

BRIEF DESCRIPTION OF THE DRAWINGS

FIG. 4 is a cross sectional view in elevation taken along line 4—4 of FIG. 2, but including those parts which were fragmentally removed.

FIG. 5 is an elevational view in section taken along line 5—5 of FIG. 2, but again showing those parts which were fragmentally removed.

DESCRIPTION OF THE PREFERRED EMBODIMENTS

Figure 1:
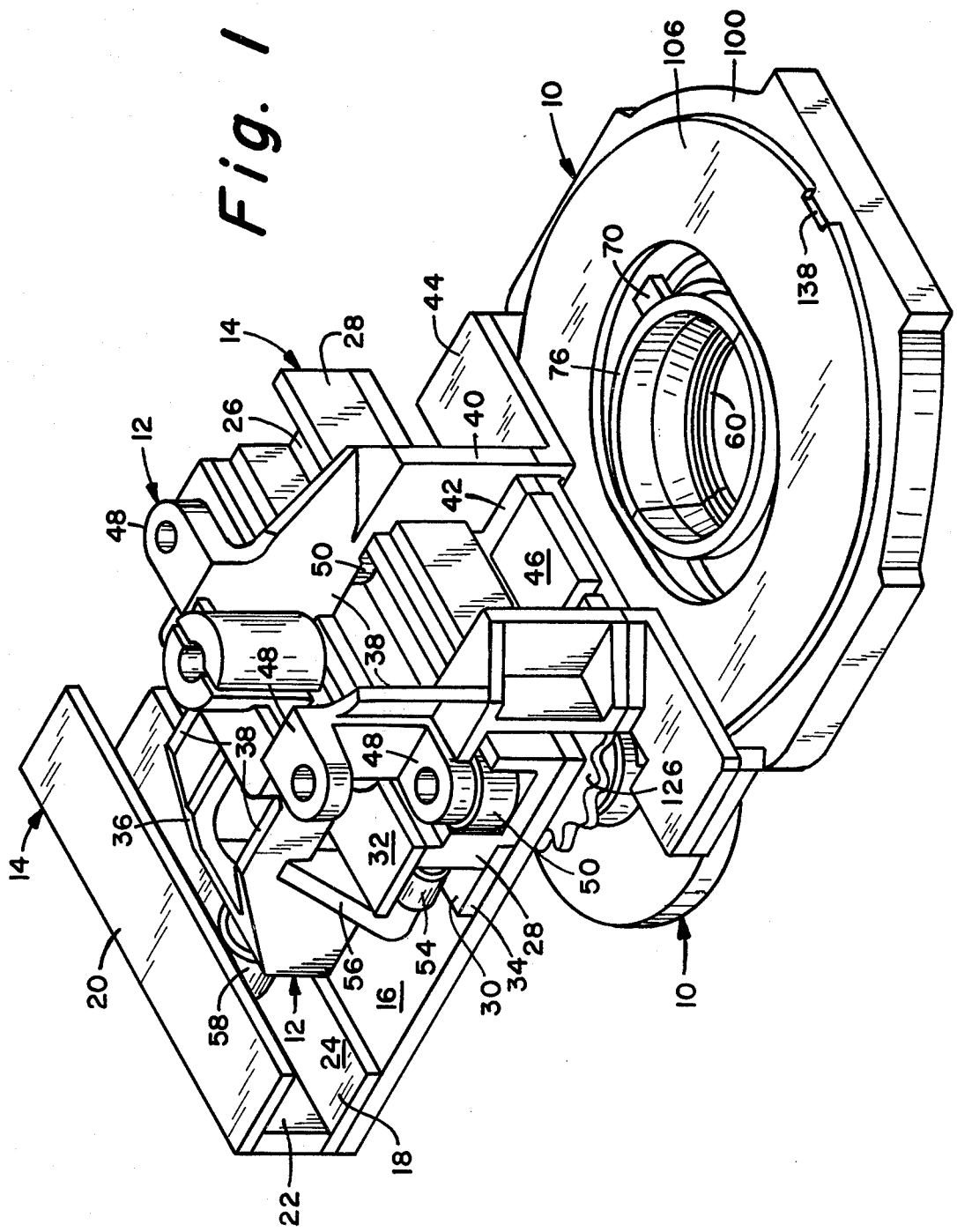
FIG. 1 is a perspective view of a neck ring mechanism embodying the present invention with the neck ring in a closed position and shown attached to a suitable carrier means for conveying the neck ring mechanism along a predetermined path.
Figure 7:
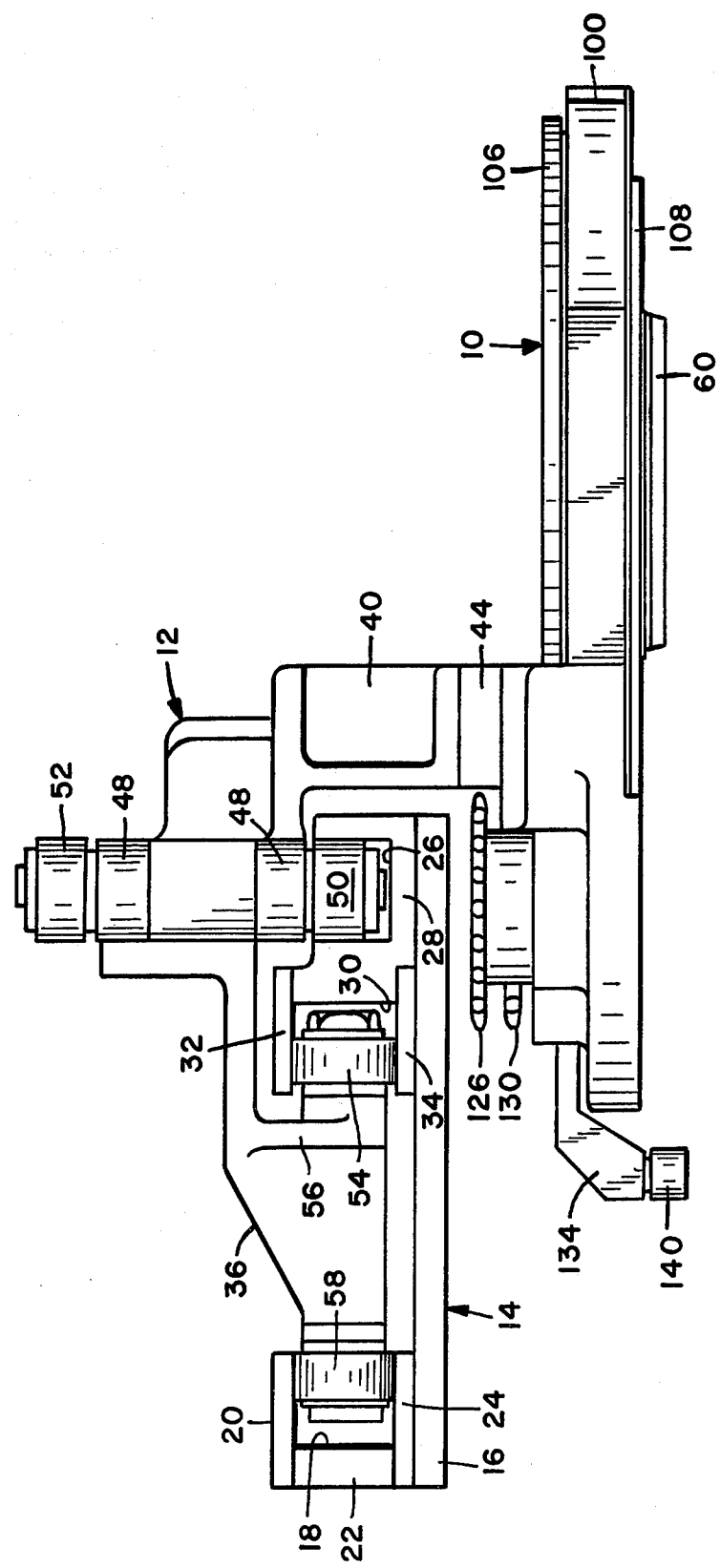
FIG. 7 is a side elevational view of the neck ring mechanism and carrier means shown in FIG. 1.

Referring now particularly to FIGS. 1 and 7, a neck ring mechanism 10 is shown being carried by a suitable carrier assembly 12 which travels along a fixed track 14 defining a predetermined path of travel of such neck ring assembly 10. The track 14, which may be part of a machine support structure, includes a bottom plate 16; a rearward C-shaped channel 18 for limiting vertical movement of the carrier 12 comprising a top wear plate 20, a back plate 22, and a bottom wear plate 24; a forward U-shape channel 26 for limiting lateral movement of the carrier 12, formed in a U-shaped channel member 28; and a central C-shape channel 30 for limiting vertical movement of the carrier, formed with an upper wear plate 32 and a lower wear plate 34 secured to channel member 28.

Figure 8:
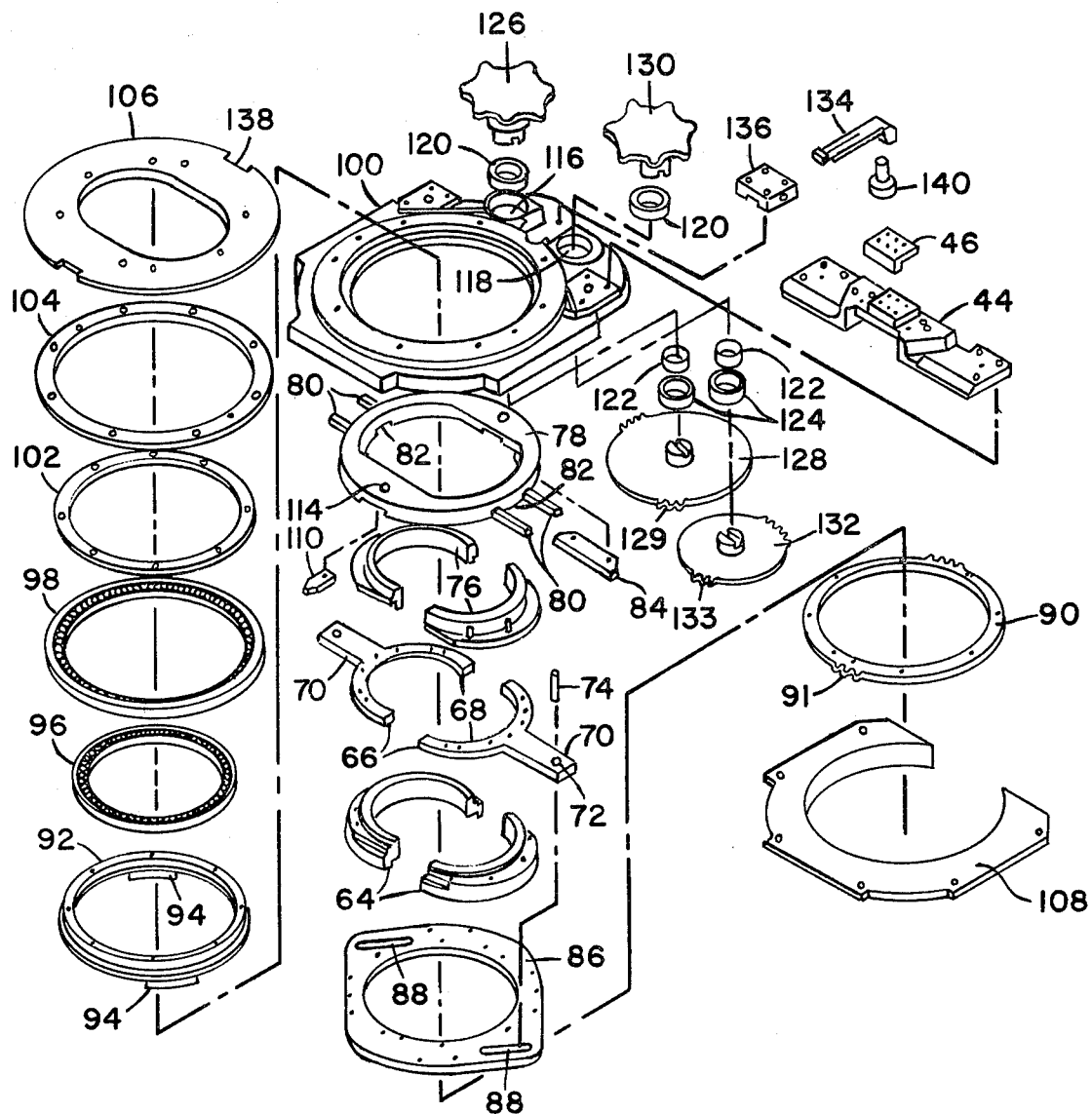
FIG. 8 is an exploded schematic view of the elements comprising the neck ring mechanism.

The carrier assembly 12 has a somewhat U-shaped frame 36 with the side portions 38 thereof terminating in a forwardly open connecting portion 40, having a crossbar 42 connected between the side portions 38. A mounting plate 44 is shown connecting the neck ring mechanism 10 to the carrier assembly 12 by means of a holding plate 46 overlying cross bar 42 so that the units may be suitably bolted together (see also FIGS. 2 and 8). Each of the side portions 38 has a pair of outwardly extending link mounting projections 48 for mounting a plurality of such carriage assemblies 12 together with link members in a chain-like fashion. In addition, the lower link mounting projections 48 function to mount lower transverse guide rollers 50 which are guided along their longitudinal travel by forward U-shape channel 26. The upper link mounting projections 48 may be utilized to mount rollers 52 (FIG. 7) which may engage an upper rail or drive sprockets not shown. In addition, a pair of rollers 54 are mounted by means of flanges 56 to the side portions 38 for longitudinal travel in central C-shape channel 30, whereas a roller 58, attached to the rearward portion of U-shaped frame 36, rides in rearward C-shaped channel 18, with roller 54 and channel 30 providing vertical stability to the carrier assembly 12 as it moves along track 14.

Referring now more particularly to FIGS. 2, 4, 5, 6 and 8, neck ring 60 is shown comprising movable neck ring segments 62 bolted to the bottom of a pair of neck ring holders 64. The inner contour of the neck ring 60 determines the desired finish to be applied to the glass article initially formed therein and carrier thereby, and accordingly the neck ring mechanism 10 may be supplied with a variety of neck ring segments 62 so as to produce the particular finish desired.

The neck ring holders 64 are bolted to the bottom of a pair of slidable yokes 66, with the holders 64 functioning as spacers and stiffeners for the slidable yokes 66. Each of the slidable yokes 66 has a central yoke portion 68 and an outwardly extending tongue 70 having an opening 72 extending therethrough and provided with a dowel pin 74 frictionally fit therewithin. A plunger guide 76 is bolted down onto the upper surface of each slidable yoke 66 and functions to loosely guide a parison plunger toward the neck ring 60.

An inner bearing ring 78 functions as a guide for the slidable yokes 66. The inner bearing ring 78 has a pair of lugs 80 extending outwardly from each end thereof with a recess 82 formed in the bottom surface of the bearing ring between such lugs. The outwardly extending tongues 70 of the slidable yokes 66 guidably slide within the recesses 82 and between the outwardly extending lugs 80, such that the tongues are guided along their upper surface by the recesses and on each side by both the recesses 82 and lugs 80. Further, the central yoke portions 68 are guided vertically during their horizontal sliding movement by grooves formed in the bottom of the inner bearing ring 78 and a pair of yoke slide plates 84 which are bolted to the bottom of the bearing ring 78.

A cam plate 86 has a pair of opposed slots 88 which receive dowel pins 74, press fit in openings 72 formed in the tongues 70 of slidable yokes 66. The slots 88 are formed at an angle with respect to a central axis of rotation of the cam plate 86, such that upon rotation of the cam plate through a predetermined arc, the dowel pins are cammed inwardly or outwardly by the slots 88 so as to close and open the slidable yokes 66. Thus, as shown by the right hand side of FIGS. 4 and 6, as the cam plate 86 is rotated clockwise with respect to the slidable yokes, the neck ring 60 is cammed to an open position, whereas as shown by the left side of FIGS. 4 and 6, when the cam plate 86 is rotated in a counterclockwise direction, the neck ring segments 62 of neck ring 60 are cammed into a closed position. With the neck ring in the closed position, the slots 88 in cam plate 86 are positioned nearly 90 degrees to an axis passing through the outwardly extending tongues 70 of slidable yokes 66, so that the neck ring cannot be opened by a force applied against the inside of the neck ring. The top of the cam plate 86 also serves as a bottom guide for the slidable yokes 66 as they move between their opened and closed positions. A main drive gear 90 is bolted to the bottom of the cam plate 86.

An outer bearing ring 92, having a plurality of downwardly extending arcuate feet 94, is secured to the upper surface of the cam plate 86. An inner bearing 96 is positioned between inner bearing ring 78 and outer bearing ring 92, and rests upon an outer peripheral flange of inner bearing ring 78 and an inner peripheral flange of outer bearing ring 92 (see FIGS. 4 and 5). An outer bearing 98 is positioned between outer bearing ring 92 and neck ring housing 100, such that the inside race of outer bearing 98 encircles the outside diameter of bearing ring 92 and the outside race of outer bearing 98 is positioned adjacent an inner diameter of the neck ring housing 100. An inner bearing retaining ring 102 is bolted to the top of bearing ring 92 for retaining inner bearing 96 in position, whereas an outer retaining bearing ring 104 is bolted to the housing 100 for retaining outer bearing 98 in position. A top cover plate 106 is bolted to inner bearing ring 78 and a bottom cover 108 is bolted to the bottom of housing 100 and serves as a shield for the drive gear 90.

The inner bearing 96 provides for relative rotation between the cam plate 86 and the slidable yokes 66, for opening and closing the neck ring segments 62 of neck ring 60, upon the actuation of drive gear 90 attached to cam plate 86, in a manner hereinafter described. The outer bearing 98 provides for the rotation of the neck ring 60 within the housing 100, again through the actuation of drive gear 90.

Figure 6:
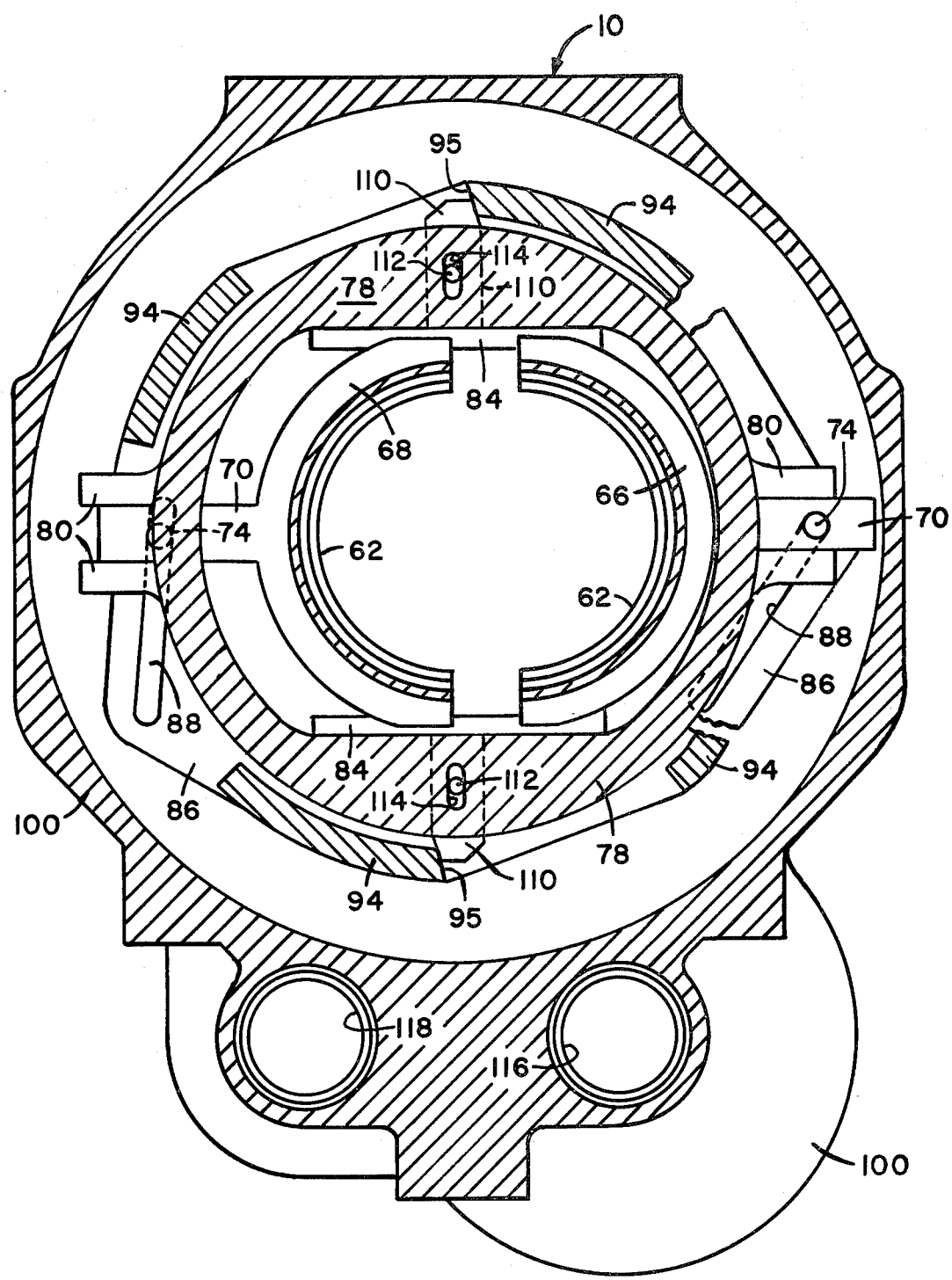
FIG. 6 is a plan view in section taken along line 6—6 of FIG. 5, with a portion broken away so as to show the position of the cam plate when the neck ring is in its open position, as shown by the right hand neck ring segment.

As shown particularly in FIG. 6, a pair of stop blocks 110 are secured to an under surface of inner bearing ring 78, and are adjusted radially outwardly by means of tightening screws 112 and slots 114 so as to engage end portions 95 of arcuate feet 94 upon rotation of cam plate 86. By adjusting the stop blocks 110 so as to bear against the feet 94 of outer bearing 92, the rotational travel of the cam plate 86 and bearing ring 92 relative to inner bearing ring 78 is limited so that end portions of the slots 88 of cam plate 86 do not contact dowel pins 74 sliding therein during the closing of neck ring 60. Were the ends of the slots 88 allowed to continuously impact the dowel pins during the closing of the neck ring, the pins would become distorted and wedge within the slots thus making it extremely difficult to open the neck ring segments. In FIG. 6, the stop blocks 110 are shown being engaged with those end portions 95 of feet 94 on outer bearing ring 92 which engage such stop blocks when the cam plate is rotated in a counterclockwise direction for closing the neck ring segments 62 as shown on the left side of FIG. 6.

Figure 3:
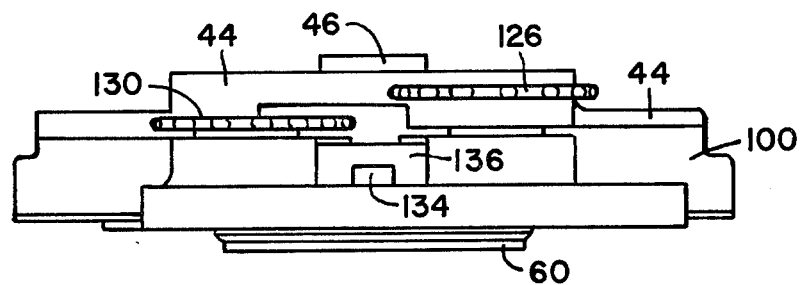
FIG. 3 is an end elevational view of the device shown in FIG. 2.

The neck ring housing 100 has a pair of openings 116 and 118 extending through a rearward portion thereof, each of which receives upper bearings 120, spacers 122 and lower bearings 124. A rotation and close sprocket 126 is positioned within the upper bearing 120 of opening 116, whereas a large gear part 128 is positioned within the lower bearing 124 of opening 116 in such a manner so that the teeth 129 thereof mesh with the teeth 91 of main drive gear 90. In a like manner, an opening sprocket 130 is positioned for rotation in upper bearing 120 of opening 118 and a small gear part 132 is positioned within the lower bearing 124 of opening 118 such that the gear teeth 113 thereof mesh with the teeth 129 of large gear part 128. The sprockets and gears within each opening are bolted together for unitary rotation therewithin. It will be noted particularly in FIGS. 3 and 7, that the sprockets 126 and 130 are positioned at different elevational levels so as to selectively engage roller tracks for operating the opening, closing and rotation of the neck ring 60 and its supporting parts.

Figure 2:
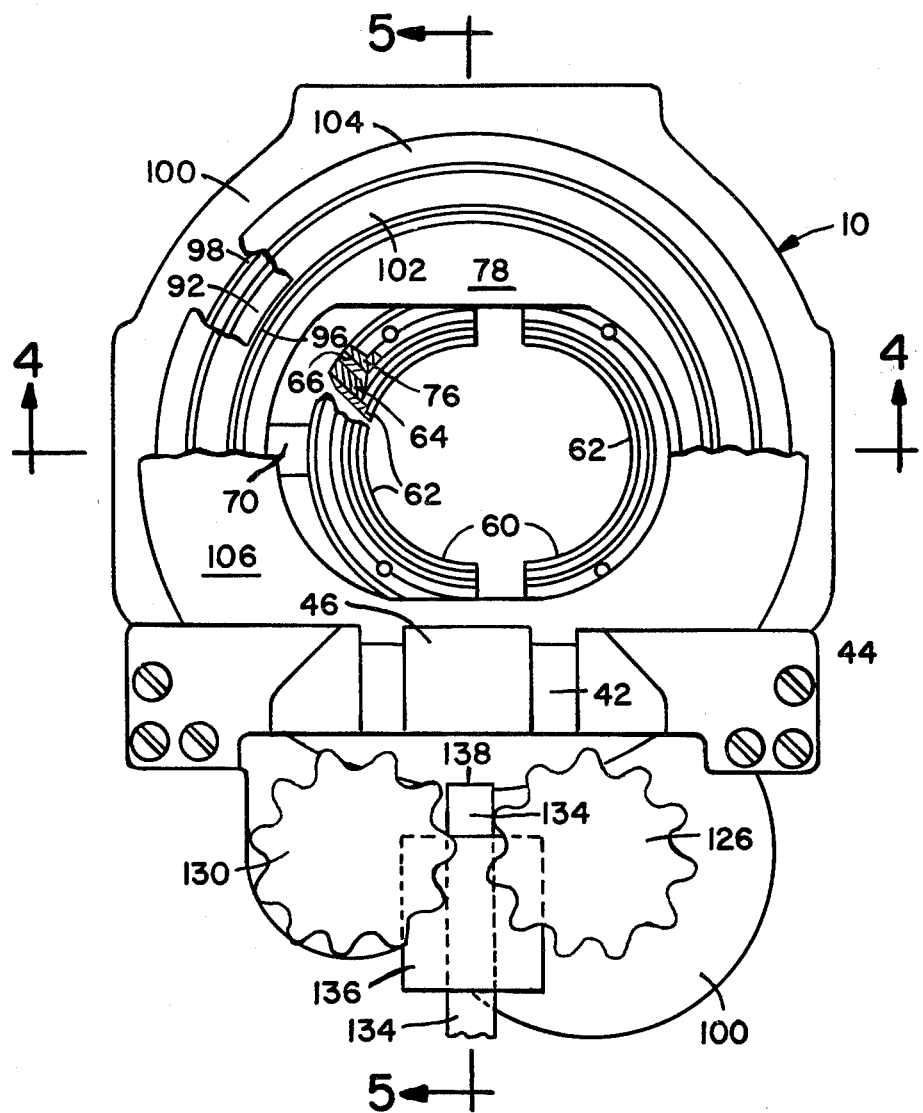
FIG. 2 is a top plan view of the neck ring mechanism shown in FIG. 1, but fragmentally cut away in various portions to show underlying elements, and also showing the right hand neck ring segment in its open position.
Figure 9:
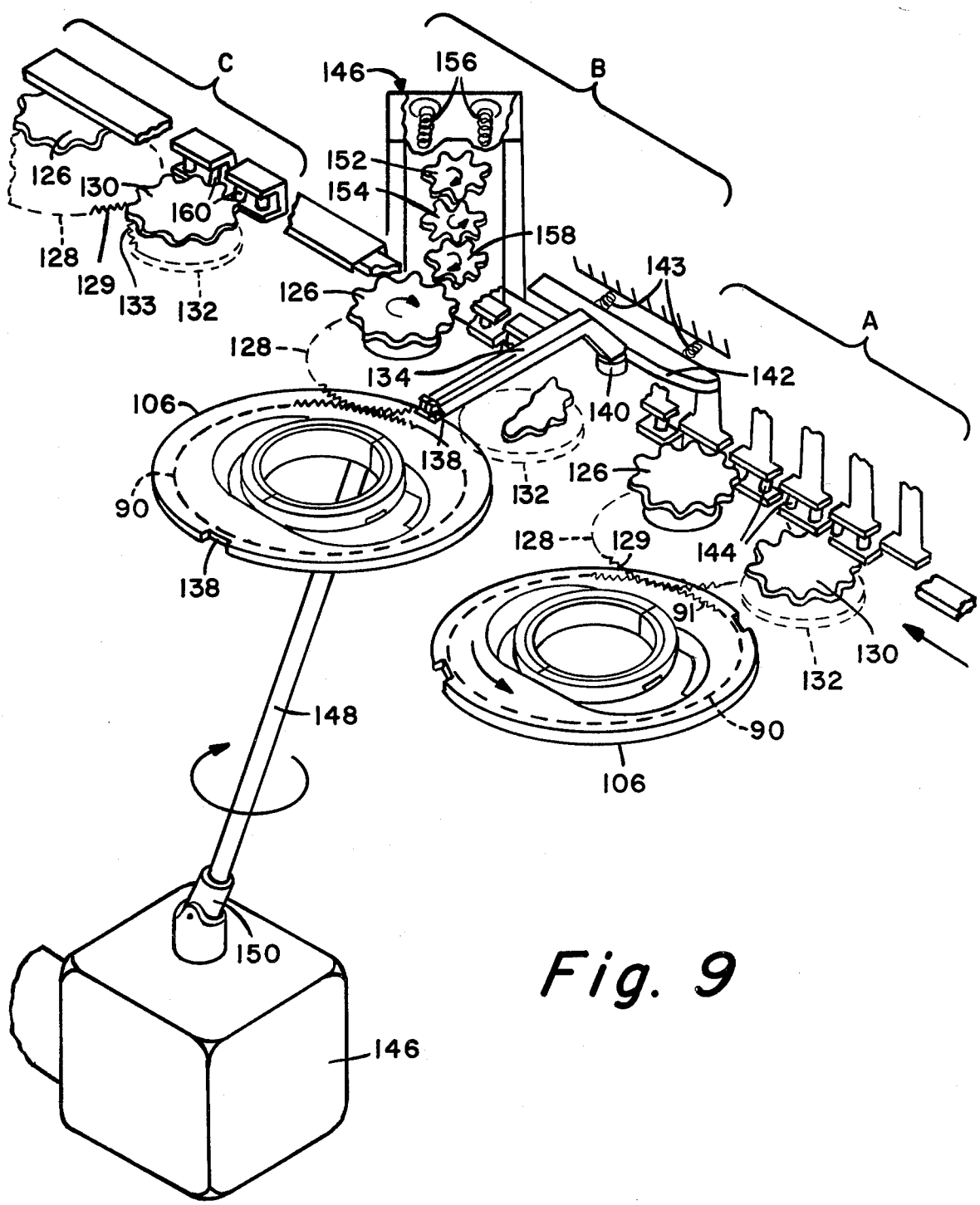
FIG. 9 is a somewhat schematic illustration of a rotational slowdown mechanism and the sprocket actuator for rotating and opening the neck ring segments.

A latch pin 134 is slidably mounted on a top portion of the housing 100 by means of a latch pin cover 136. As shown in FIGS. 2 and 9, the inner end of the latch pin 134 engages with a notch 138 formed in the edge of the top cover plate 106 to prevent the neck ring from rotating. A roller 140 is attached to an outer end of the latch pin 134 and periodically rides along a cam surface such as 142 to slide the latch pin 134 into or out of engagement with the notch 138. Spring biased detents or the like provide the latch pin 134 with a friction fit within the housing 136 to retain the latch pin in position when roller 140 is not being activated by a cam surface 142.

In operation, it will be appreciated that a plurality of neck ring mechanisms 10 are connected together in a chain-like fashion by suitable link means pivotally secured between link mounting projections 48 on adjacent neck ring carrier assemblies 12 and that a plurality of such neck ring mechanisms are carried by their carrier assemblies successively along a closed path defined by the track 14. Any suitable drive means may be utilized to move the connected carrier and neck ring assemblies through such predetermined path, such as a driven sprocket wheel engaging rollers 52 mounted on the upper portion of link mounting projections 48. As the neck ring assemblies are moved through such closed path, the neck rings carried thereby are periodically closed, rotated and opened by engaging various actuating mechanisms adjacent such path.

In order to close the half segments 62 of each neck ring 60, the latch pin 134 must be engaged within the notch 138 of the top cover 106. Thus, at a preselected time roller 140 engages a cam surface 142 which moves latch pin 134 within latch pin cover 136 into engagement with notch 138 of top cover plate 106, and thus fixably positions the cover plate with respect to the rotationally stationary housing 100. With the cover 106 in its latched position, rotation and close sprocket 126 moves into operable engagement with a series of stationary chain-like rollers which rotate the sprocket in a clockwise direction as the assembly 12 moves along track 14. Since sprocket 126 and large gear 128 rotate unitarily, gear 128 also is rotated in a clockwise direction which engages main drive gear 90 attached to the under surface of cam plate 86, and accordingly gear 90 and cam plate 86 are rotated in a counterclockwise direction. Due to the fact that outwardly extending tongues 70 of slidable yokes 66 are retained in arcuate position by lugs 80 and recesses 82 of inner bearing ring 78 and further in view of the fact that latched top cover 106 is secured to inner bearing ring 78, the inner bearing ring and outwardly extending tongues 70 are arcuately fixed with respect to housing 100. Thus, as the cam plate 86 is rotated in a counterclockwise direction, dowel pins 74 are cammed inwardly by opposed slots 88 in cam plate 86 to close slidable yokes 66 and accordingly neck ring segments 62 of neck ring 60, as shown particularly on the left hand side of FIG. 6. The series of sprocket drive rollers ends at a point which coincides with the completion of the neck ring closing.

When it is desired to rotate the neck ring, the rotation and close sprocket 126 engages another series of sprocket drive rollers 144, such as shown in section A of FIG. 9, as the neck ring mechanism 10 is carried by the carrier assembly 12 along a predetermined path as defined by track 14. Prior to entering such drive rollers, latch pin 134 is cammed outwardly so as to disengage with notch 138 in top cover plate 106. As will be recalled from FIGS. 3 and 7, the rotation and close sprocket 126 is at a higher elevation than the opening sprocket 130, and accordingly as shown in section A of FIG. 9, only rotation and closed sprocket 126 engages the sprocket drive rollers 144, as they are at an elevation which is above the elevation of opening sprocket 130. As the rotation sprocket 126 is moved along sprocket drive rollers 144, the sprocket and large gear 128 are rotated in a clockwise direction, with the teeth 129 of gear 128 engaging the teeth 91 of main drive gear 90 and rotating the same in a counterwise direction similar to the previously described closing rotation. However, upon the completion of the closing rotation, stop blocks 110 attached to inner bearing ring 78 are in butting relationship with end portions 95 of the arcuate feet 94 of outer bearing rings 92 secured to the upper surface of cam plate 86. Thus, as main drive gear 90 is rotated in a counterclockwise direction, cam 86 secured to drive gear 90 and outer bearing ring 92 secured to cam plate 86 are also rotated in a counterclockwise direction.

Further, in view of the fact that the latch pin 134 is out of engagement with top cover plate 106, the top cover is free to rotate, and since stop blocks 110 are in contact with the end portions 95 of arcuate feet 94 of outer bearing ring 92 as shown in FIG. 6, the counterclockwise rotation of the outer bearing ring results in the counterclockwise rotation of inner bearing ring 78 and top cover 106. Also, since the arcuate position of outwardly extending tongues 70 of the slidable yokes 66 is determined by the position of the lugs 80 and recesses 82 retaining such tongue portions, the slidable yokes 66 and its associated parts including neck ring segments 62 of neck ring 60 are rotated simultaneously with the rotation of the inner bearing ring 78.

When operating at relatively high manufacturing speeds, it is desirable to utilize a slow rotation mechanism when stopping the rotation of the neck ring so as to prevent torsional breakage of the ware retained thereby. Thus, when rotation is completed, the rotation sprocket 126 leaves the series of drive rollers 144 and immediately enters a slow rotation mechanism 146 shown in section B of FIG. 9. The slow rotation mechanism includes a suitable driven source to a gear box 146 having an output drive rod 148 coupled thereto by a universal joint 150. The drive rod rotates the end sprocket 152 of a gear train 154, which train is spring loaded at 156 to compensate for an alignment malfunction so as to prevent damage to the neck ring mechanism. The gear train 154 is utilized due to space restrictions adjacent the path of travel of the neck ring mechanism and to obtain correct rotation, however only forward sprocket 158 is required where it is possible to directly connect the drive rod 148 therewith without interfering with the movement of the neck ring mechanism.

The forward sprocket 158 is driven so that its teeth rotate in the same direction as the travel of the neck ring mechanism along its predetermined path so that upon engagement with rotation sprocket 126, the rotation sprocket is rotated at a slower speed than that produced by its travel along sprocket drive rolls 144. When the rotation sprocket 126 of neck ring mechanism 10 leaves the slowdown mechanism 146, rotational movement of the neck ring is stopped completely. Simultaneously with the stopping of rotation of the neck ring 60, latch pin 134 is cammed inwardly by means of cam surface 142 into notch 138 of cover plate 106 to fixedly position the cover plate and inner bearing ring 78 with respect to housing 100. As shown, the cam surface 142 is spring tensioned at 143 so as to urge the outer end of the latch pin 134 into the notch 138 as the rotation of sprocket 126 ceases.

As the neck ring mechanism proceeds along its path of travel, the ware retained thereby cools and the neck ring is opened to release the ware for take out. Latch pin 134 is retained in position within notch 138 of top cover plate 106 so as to prevent rotation of the cover plate, inner bearing ring 78 and slidable yokes 66. Opening sprocket 130 engages a series of drive rollers 160 as shown in section C of FIG. 9. Opening sprocket 130 and small gear part 132 are accordingly rotated in a clockwise direction as the neck ring mechanism continues movement along its predetermined path. The teeth 133 of small gear 132 engage the teeth 129 of large gear 128 and rotate large gear 128 in a counterclockwise direction, which in turn rotates the main drive gear 90 and accordingly cam plate 86 in a clockwise direction. As the cam plate 86 rotates in a clockwise direction, dowel pins 74 retained by outwardly extending tongues 70 are cammed outwardly by means of opposed slots 88 formed in cam 86, as shown in the right side of FIG. 6. Also, the opening sprocket 130 leaves the drive rollers 160 when the neck ring reaches its full open position. The ware is removed from the neck ring and the neck ring mechanism continues on through its predetermined path of travel repeating its closing, rotating and opening cycles.

Although the neck ring mechanism of the present invention may be utilized with a variety of glass forming operations known in the art, it is preferred to be utilized with the apparatus set forth in copending patent application Ser. No. 120,352, filed Feb. 11, 1980 entitled Method and Apparatus for Forming Glass Parisons, and with the method set forth in copending patent application Ser. No. 120,353, filed Feb. 11, 1980 entitled Press and Blow Glass Forming. Further, although the now preferred embodiments of the invention have been set forth herein, it will be appreciated that various changes and modifications may be made thereto without departing from the spirit and scope of the invention as set forth in the appended claims.

I claim:

1. A neck ring mechanism for transporting, rotating and releasing a glass article which comprises, a neck ring housing, a neck ring rotatably mounted within said housing and comprising a plurality of neck ring segments, an inner bearing ring mounted for rotation within said housing, means slidably mounted with respect to said inner bearing ring and operatively retaining said neck ring segments for opening and closing the segments of said neck ring, rotatable cam means for actuating said slidably mounted means, and means for rotating said cam means and camming said slidably mounted means inwardly for closing said neck ring segments and for rotating said neck ring.

2. A neck ring mechanism as defined in claim 1 wherein said means for rotating said cam means includes a main drive gear secured to said cam means for unitary rotation therewith, first sprocket and gear means for rotating said main drive gear and said cam means in one direction for closing said neck ring segments.

3. A neck ring mechanism as defined in claim 2 including second sprocket and gear means cooperating with said first sprocket and gear means so as to rotate said main drive gear in an opposite direction for opening said neck ring segments.

4. A neck ring mechanism as defined in claim 1 including means for limiting relative rotation between said inner bearing ring and said cam means to a degree sufficient for opening and closing said neck ring segments.

5. A neck ring mechanism as defined in claim 1 including latch means for periodically locking said inner bearing ring stationary with respect to said housing and preventing the simultaneous rotation of said inner bearing ring and said cam means for effecting the opening and closing of said neck ring segments.

6. A neck ring mechanism as defined in claim 1 or 5 wherein said slidably mounted means are mounted so as to be rotationally fixed with respect to said inner bearing ring for simultaneous rotation with the rotation of said inner bearing ring and for remaining rotationally stationary when said inner bearing ring is locked in a stationary position.

7. A neck ring mechanism as defined in claim 6 including stop means for permitting relative rotation between said inner bearing ring and said cam means through an arc sufficient to cam said slidably mounted means inwardly and outwardly for closing and opening said neck ring segments, and said stop means transmitting rotational movement of said cam means to said inner bearing ring for unitary rotation therewith.

8. A neck ring mechanism as defined in claim 1 wherein said slidably mounted means includes a pair of slidable yoke members each operatively retaining a neck ring segment, a tongue portion extending outwardly from each yoke member, said tongue portions being guidably received by portions of said inner bearing ring for sliding movement relative therewith, and said tongue portions having pin means engaged by said cam means for sliding said tongue portions and slidable yokes toward and away from another for closing and opening said neck ring.

9. A neck ring mechanism as defined in claim 1 wherein said slidably mounted means includes a pair of slidable yokes retained by said inner bearing ring for sliding movement toward and away from each other, a neck ring segment being operatively connected to each of said slidable yokes, and means connected to said slidable yokes and engagable by said cam means for opening and closing said neck ring segments upon selected rotation of said cam means.

10. A neck ring mechanism which is both rotatable for rotating a glass article retained thereby and slidably openable for releasing such article which comprises, a housing, a plurality of yoke means mounted within said housing for sliding movement toward and away from each other, a plurality of neck ring segments each operatively connected to one of said yoke means, cam means for selectively sliding said yoke means toward and away from each other for closing and opening said neck ring segments and for rotating said neck ring segments when they are in a closed position, and means for rotating said cam means for effecting the closing, rotation and opening of said neck ring segments.

11. A neck ring mechanism as defined in claim 10 including ring means mounted within said housing for both limited rotation relative to said cam means and for rotation concomittently with said cam means.

12. A neck ring mechanism as defined in claim 11 wherein said plurality of yoke means comprising a pair of yoke means, said pair of yoke means are slidably retained by said ring means, and pin means extends between each of said pair of yoke means and said cam means for engaging a cam surface on said cam means to open and close said neck ring segments upon effecting the limited rotation between said ring means and said cam means.

13. A neck ring mechanism as defined in claim 11 or 12 including means for limiting the relative rotation between said ring means and said cam means, and said limiting means connecting said ring means and cam means together for said concomittent rotation.

14. A neck ring mechanism as defined in claim 10 wherein said rotating means includes a ring gear affixed to said cam means for unitary rotation therewith.

15. A neck ring mechanism having a segmented neck ring which is not only slidably closable and openable for retaining and releasing a glass article but which is also rotatable for rotating the retained article which comprises, a housing, means for moving said housing along a predetermined path, a cam plate mounted for rotation within said housing, an inner bearing ring mounted for both relative rotational movement with respect to said cam plate and for unitary rotation therewith, a pair of opposed yoke members slidably mounted within said inner bearing ring toward and away from each other, a pair of neck ring segments each being operatively attached to one of said yoke members so as to form a split neck ring which is openable and closable upon the sliding movement of said yoke members, said yoke members being mounted for unitary rotation with said inner bearing ring, stops means for limiting the relative rotation between said cam plate and said inner bearing ring, ring gear means attached to said cam plate for unitary rotation therewith, gear means for rotating said ring gear and said cam plate in clockwise and counterclockwise direction, cam surface means forming a part of said cam plate, pin means secured to each of said yoke members and operatively engagable with said cam surface means; drive means for rotating said ring gear and cam plate in one direction for camming said yoke means and accordingly said split neck ring into a closed position as said inner bearing rings moves through a predetermined arc relative to said cam plate and for rotating said cam plate, said inner bearing ring and said closed neck ring unitarily upon operable engagement of said stop means; and additional drive means for rotating said ring gear and cam plate in an opposite direction for camming said yoke members and accordingly said neck segments into a open position so as to release a glass article retained thereby.

16. A neck ring mechanism as defined in claim 15 wherein said stop means includes abutment portions upon an outer bearing ring secured to said cam plate which are engagable by stop blocks retained by said inner bearing ring.

17. A neck ring mechanism as defined in claim 16 wherein a cover plate is fixedly secured to said inner bearing ring so as to be rotatable therewith, and latch means secured to said housing lockably retaining said cover plate in fixed position with said housing to positionally locate the position of inner bearing ring prior to the opening and closing of said yoke members and accordingly said neck ring segments.

18. A neck ring mechanism as defined in claim 15 wherein said drive means includes a sprocket wheel periodically engagable with a plurality of sprocket drive rollers as said moving means moves said housing through its predetermined path.

\* \* \* \* \*